United States Patent [19]

Dlugos

[11] 4,137,568
[45] Jan. 30, 1979

[54] CIRCUIT FOR ESTABLISHING THE AVERAGE VALUE OF A NUMBER OF INPUT VALUES

[75] Inventor: Daniel F. Dlugos, Huntington, Conn.

[73] Assignee: Pitney-Bowes, Inc., Stamford, Conn.

[21] Appl. No.: 786,411

[22] Filed: Apr. 11, 1977

[51] Int. Cl.² .................. G06F 7/54; G01G 23/42
[52] U.S. Cl. .................................. 364/734; 177/25; 235/92 WT; 364/575; 364/761
[58] Field of Search ......... 235/183, 152, 156, 92 WT, 235/92 MT, 92 SA, 92 DM; 177/210, 25; 364/575, 734, 761, 811

[56] References Cited

U.S. PATENT DOCUMENTS

| | | | |
|---|---|---|---|
| 3,446,299 | 5/1969 | Leonowicz | 235/183 |
| 3,553,444 | 1/1971 | Tong | 235/183 |
| 3,638,001 | 1/1972 | Gordon | 235/152 |
| 3,807,630 | 4/1974 | Stewart | 364/734 |
| 3,860,802 | 1/1975 | Knothe et al. | 235/151.33 |
| 3,937,943 | 2/1976 | Debrunner et al. | 235/183 |
| 4,036,316 | 7/1977 | Rock | 235/151.33 |

Primary Examiner—Felix D. Gruber
Attorney, Agent, or Firm—Peter Vrahotes; William D. Soltow, Jr.; Albert W. Scribner

[57] ABSTRACT

For averaging a selected number of input values, a circuit includes a counter which is enabled to count up to the selected number. During the counting, samples of input values are synchronously loaded into an accumulator circuit having shift capabilities. A control circuit responds to a selected number in the counter to load a binary 1 into a related stage in a shift register. The control circuit causes the binary 1 to be shifted through the register while the contents of the accumulator circuit are synchronously shifted toward the least significant bit of the accumulator circuit to effect a binary division. Both shift operations are terminated by a shift stop circuit which detects the presence of the binary 1 signal at a predetermined shift register stage.

8 Claims, 6 Drawing Figures

CIRCUIT FOR ESTABLISHING THE AVERAGE VALUE OF A NUMBER OF INPUT VALUES

BACKGROUND OF THE INVENTION

The present invention relates to a measuring circuit and more particularly to a circuit for establishing the average value of a selected number of input values.

In industry and commerce, the weights of objects or materials must often be accurately ascertained. As one example, the exact weight of letters or parcels to be mailed in the national postal system must be ascertained so that the user will know how much postage he is required to use. If the weight cannot be accurately measured, the user may place too little or too much postage on the mailed item. If not enough postage is used, the postal service will normally return the item to the mailer resulting in delayed delivery. If too much postage is used, the mailer is wasting money. While the cost of excess postage may be low on a per item basis, the accumulated costs over a period of time can be very significant.

A number of known scale mechanisms are capable of consistently measuring weight with the requisite accuracy when the mechanisms are used under ideal operating conditions. However, scales employed in industry and commerce are rarely used under ideal conditions. For example, such scales are normally located in buildings which also contain electromechanical machinery, such as compressors, generators, air conditioners, etc. Such machines, many of which are firmly anchored to the floor or (in the case of air conditioners) to the roof of the building vibrate at a relatively low frequency during operation. As a result, vibrations are set up in the floor and walls of the building. These vibrations can be transmitted to the scale mechanisms to cause "jitter" in the scale output making it difficult to obtain an accurate reading.

In certain relatively sophisticated systems, the scale output may be applied directly to a computerized control unit which utilizes the weight-representing signal in further computations; for example, the calculation of postage required for a letter or parcel. Where the weight-representing signals are applied directly to a control unit, there is no opportunity for an operator to decide whether visually-detected "jitter" in the scale output is too great to prevent an accurate scale reading. In such systems, it becomes even more critical that an accurate scale reading be obtained.

SUMMARY OF THE INVENTION

The present invention reduces inaccuracies in scale readings due to mechanical vibrations by averaging a selected number of samples of a scale output signal over a period of time.

The averaging circuit includes a multistage accumulator circuit, a counter and means for loading the accumulator circuit with sample input values in synchronism with the performance of a counting operation in the counter. The circuit further includes a shift register which is loaded with a predetermined binary signal at the conclusion of the counting operation. Control logic causes the contents of the shift register and the contents of the accumulator circuit to be synchronously shifted through a predetermined number of shifts related to the selected number of input samples to effect a binary division of the contents of the accumulator circuit.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DETAILED DESCRIPTION

Figure 1:
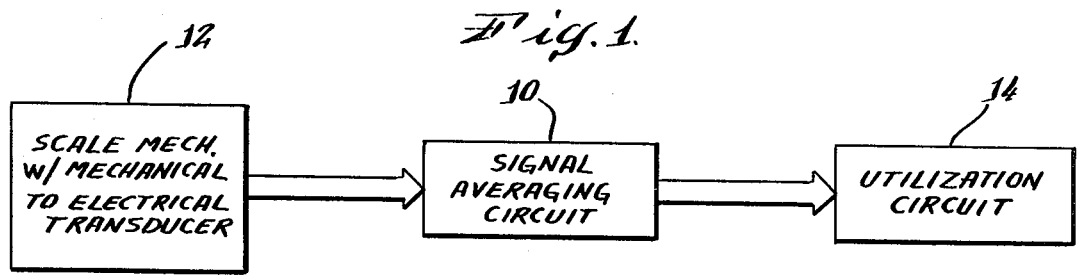
FIG. 1 is a basic block diagram of a system into which the present invention may be incorporated.

Referring to FIG. 1, a signal averaging circuit 10 is interposed between the output of a scale mechanism 12 and a utilization circuit 14. The scale mechanism 12 may, by way of example, be part of a mail handling system. Regardless of its application, the scale mechanism 12 will include a suitable mechanical-to-electrical transducer, such as a Moire optoelectronic transducer of the type disclosed in application Ser. No. 653,850 filed Jan. 30, 1976, now Pat. No. 4,044,847 and assigned to the assignee of the present invention. The scale mechanism and its included transducer are not a part of the present invention and no further details will be provided. For purposes of describing the present invention it is important only that the scale output is a binary signal which is presented in parallel at a number of input leads to the signal averaging circuit.

As will be described in more detail later, signal averaging circuit 10 establishes the average value of a selected number of samples of the weight signal provided at the output of scale mechanism 12.

The utilization circuit 14 may take a number of forms. As one example, circuit 14 may be a microprocessor control for automatically computing and printing postage for letters or parcels. As another example, circuit 14 may be a digital display device. The particular embodiment of circuit 14 is not part of the present invention. Circuit 14 may be any circuit which can accept and utilize multibit binary words.

Figure 2:
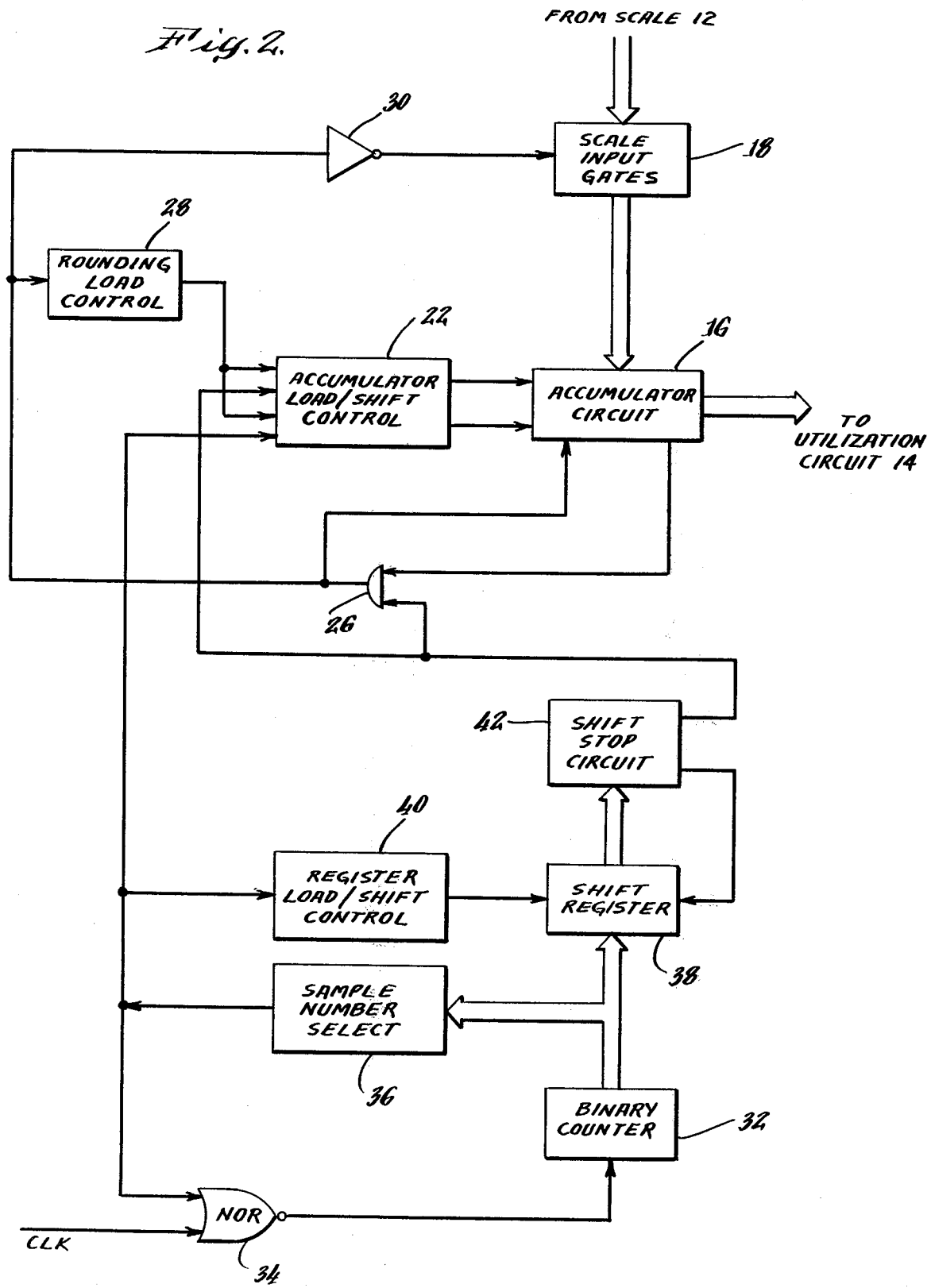
FIG. 2 is a block diagram of the signal averaging circuit shown in block form only in FIG. 1.

Referring to FIG. 2, a signal averaging circuit constructed in accordance with the present invention includes an accumulator circuit 16 electrically coupled to the outputs of the scale mechanism 12 through an array of scale input gates 18 which either pass or block binary signals provided by scale mechanism 12 as a function of a control signal provided at the output of an inverter amplifier 30. Accumulator circuit 16, acting under the control of an accumulator load/shift control circuit 22, loads and totals a selected number of samples of the scale mechanism output signal and then effects a binary division of the total to yield an averaged signal.

At least one stage of accumulator circuit 16 is connected to an AND gate 26 which, in combination with a rounding load control circuit 28 provides an upward rounding of the averaged signal under certain conditions. Outputs from AND gate 26 are applied to accumulator circuit 16, to rounding load control circuit 28 and to the inverter amplifier 30.

The accumulator load/shift control circuit 22 is itself controlled by circuitry including a binary counter 32 having an input from a NOR gate 34. Parallel outputs from binary counter 32 are presented to a sample number select circuit 36 and to a shift register 38. The function of the sample number select circuit 36 is to control the number of samples which are to be loaded into accumulator circuit 16. The output of circuit 36, which is enabled only when the counter 32 has attained a count equal to the selected number of samples, is applied at a second input to NOR gate 34, to a register load/shift control circuit 40 and to the accumulator load/shift control circuit 22.

The register load/shift control circuit 40 controls the loading of a binary 1 signal from counter 32 into a selected stage of shift register 38 and the subsequent shifting of that binary 1 signal through register 38.

Parallel outputs from shift register 38 are presented to a shift stop circuit 42 which terminates shifting operations in both register 38 and (through accumulator load/shift control circuit 22) the accumulator circuit 16 when the binary 1 signal is shifted into a particular stage of shift register 38.

The operation of the above-described circuit is set forth in general terms below. A more detailed description of the operation will accompany a more detailed description of the circuitry included within the various blocks of the described system.

When a load is placed on a pan of the scale, the load supporting structure will be caused to deflect. Sample readings of the weight are taken after a given period of time, corresponding to a given scale condition. This scale condition corresponds to approximate or near steady state, i.e. the support structure never really stops moving, but does damp sufficiently to what can be considered a steady state condition.

The given time period necessary to achieve this steady state condition depends on certain scale parameters, such as spring rate, damping coefficients, mass, etc. In the present invention a time of 300–500 milliseconds was allowed to elapse before sample readings were taken.

The steady state condition may also be determined by testing methods, such as taking preliminary load readings.

The operation of the averaging circuit is initiated by clearing accumulator circuit 16, rounding load control circuit 28, shift stop circuit 42, shift register 38, register load/shift control circuit 40 and binary counter 32. When counter 32 is cleared, the output of sample number select circuit number 36 goes low, causing accumulator load/shift control circuit 22 to generate load-enabling signals. The low output from sample number select circuit 36, when applied to NOR gate 34, also permits that gate to pass regularly-occurring clock pulses $\overline{CLK}$ to the binary counter 32. Counter 32 immediately begins to accumulate applied clock pulses. Simultaneously, accumulator 16 is synchronously loaded with input signal samples under the control of a stream of delayed clock pulses $\overline{DCLK}$. The counting operation will continue with one input sample being added to the subtotal of all previous samples in accumulator circuit 16 for each count accumulated in counter 32. When a selected number of counts (and samples) have been accumulated, the output of sample number select circuit goes high, disabling NOR gate 34 to prevent further application of clock pulses to counter 32. A sample reading is taken for every clock pulse. Each clock pulse is approximately 4.17 milliseconds. Approximately 128 samples are taken after steady state has been obtained. The time needed to collect 128 samples at the aforementioned clock rate is approximately 533 milliseconds. In other words, the clock rate controls the rate (or time) at which the sample load readings are taken. The high output of sample number select circuit 36 also causes register load/shift control 40 to generate signals needed for the transfer of a binary 1 signal from counter 32 to shift register 38. When the transfer has been completed, register load/shift control circuit 40 initiates shifting of the binary 1 signal through serially-connected stages of shift register 38. Simultaneously, accumulator load/shift control circuit 22 causes the accumulated contents of accumulator 16 to begin shifting toward the least significant bit or stage of circuit 16.

The number of shift operations which are performed is, at least in part, a function of the number of samples which are accumulated in circuit 16. For example, if 32 (or $2^5$) samples were taken, the binary 1 signal in shift register 38 and the contents of accumulator circuit 16 would be shifted through at least five serially-connected stages. In the accumulator circuit 16, shifting the data through five serially-connected states amounts to dividing the contents of accumulator circuit 16 by a factor of 32.

The shifting operations are terminated by the shift stop circuit 42 which detects the presence of the binary 1 signal in a predetermined stage of shift register 38. An output of shift stop circuit 42 is applied to AND gate 26. If a binary 1 signal is detected in the most significant fractional bit location in the accumulator circuit 16 when shifting operations are stopped by shift stop circuit 42, the output of AND gate 26 is high or enabled. This output is applied to rounding load control circuit 28, to inverter amplifier 30 and to a carry input of the stage of accumulator circuit 16 holding the 2° bit of the averaged signal. Inverter amplifier 30 inverts the input binary 1 signal to apply a binary 0 or inhibiting signal to the scale input gates 18. The gates 18 prevent passage of continually-presented scale output signals under these conditions. Rounding load control circuit 28 causes accumulator load/shift control circuit 22 to operate accumulator circuit 16 in a load mode for one clock period. During this clock period, the binary 1 carry input provided by AND gate 26 is added to the carry input of the 2° stage of accumulator circuit 16 to round the averaged signal upwardly by one binary count.

If a binary 1 signal does not appear in the most significant fractional bit location in accumulator circuit 16 when shift operations are stopped, AND gate 26 remains disabled. Rounding load control circuit 28 similarly remains disabled. Accumulator load/shift control circuit 22 continues to inhibit further addition in accumulator circuit 16. Under this set of conditions, the scale input gates 18 do not block signals from scale mechanism 12. However, the scale signals are not accepted by accumulator circuit 16 which is inhibited from either loading or shifting by accumulator load/shift control circuit 22.

After rounding, if any, is performed, accumulator circuit 16 contains an average value of the selected number of input signal values expressed as a binary number. The averaged signal, presented on parallel leads from accumulator circuit 16, can then be transferred to the utilization circuit 14 for further use.

Figure 3:
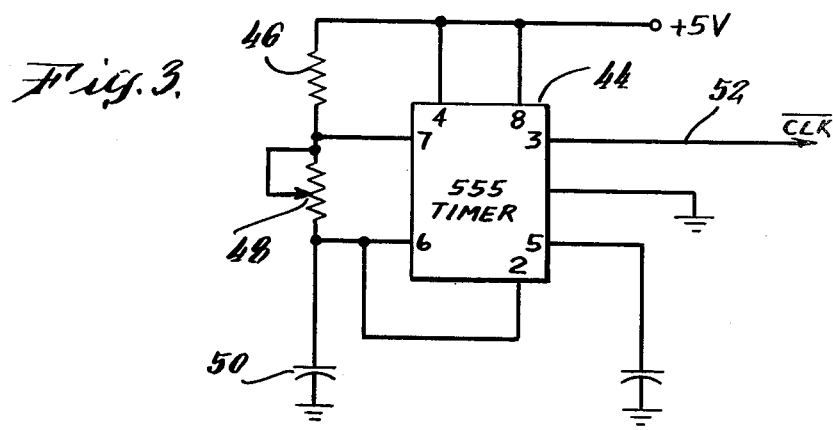
FIG. 3 is a schematic diagram of a clock pulse generator.

The signal averaging circuit employs two signals generated independently of the circuit operation. One of these signals is the clock ($\overline{CLK}$) signal which, referring to FIG. 3, may be generated using a conventional timing device such as an NE/SE555 Timer circuit available from Signetics Corp. of Sunnyvale, Calif. The NE/SE555 Timer is described in more detail at Pages 6-63 of the Signetics Data Book on Digital, Linear and MOS devices, copyright 1974. In a preferred embodiment of the invention, the value of two resistors 46 and 48 and a capacitor 50 are selected to cause timer 44 to function as an oscillator producing a pulse stream having a fixed frequency preferably selected from the 25-70 Kilohertz frequency range. These pulses appear on the $\overline{CLK}$ output terminal of timer 44. The $\overline{CLK}$ pulses generated by timer 44 are delayed slightly by a conventional time delay circuit to produce a stream of delayed clock pulses $\overline{DCLK}$ which slightly lag the $\overline{CLK}$ pulses.

The other independently-generated signal is a $\overline{CLEAR}$ signal which, in one embodiment of the invention, is produced when a plunger 53 of a momemtary contact switch 54 is depressed by an operator. The $\overline{CLEAR}$ signal generator includes a pair of conventional D-type flip flops 56 and 58. A D-type flip flop is a bistable element which transfer the binary signal on a D input terminal to a normal or Q output terminal when a $\overline{CLK}$ pulse is applied to the clock (>) input terminal of the device. The signal on the inverted or $\overline{Q}$ output terminal is always the inverse of the Q signal. Thus, a binary 1 on the D input terminal will produce a Q=1 and $\overline{Q}$=0 output upon clocking while a binary 0 D input will produce a Q=0 and $\overline{Q}$=1 upon clocking. The output signals will change only when the D input changes state.

When the plunger 53 is in its illustrated, normal position, the D input of flip flop 58 is maintained at a binary 1 signal level by a +5 volt source connected to the input through a resistor 64. An inverter amplifier 62 is connected to the lower end of resistor 64 and causes a binary zero signal to be applied to one input of a NAND gate 131 whenever the plunger 53 is in the illustrated position.

The binary 1 signal which exists at the D input to flip flop 56 also exists at the D input to flip flop 58. The binary 1 at the input to flip flop 58 keeps this flip flop in a reset condition in which its $\overline{Q}$ output is maintained at a binary 0 level. With binary 0 signals at both inputs, the output of the NAND gate 131 remains at a binary 1 level.

When an operator depresses the plunger 53, bridging contacts 60 leading to ground, to initiate the clearing operation, the output of inverter amplifier 62 immediately rises to a binary 1 level while the input to flip flop 56 falls to a binary 0 level. At the rising edge of the next clock pulse, this binary zero is propagated through flip flop 56 to the D input of flip flop 58. At the rising edge of the second clock pulse, the binary 0 input drives flip flop 58 to a reset state in which the $\overline{Q}$ output rises to a binary 1 level.

With both of its inputs at binary 1 levels, the output of NAND gate 131 will fall to a 0 level, which is the $\overline{CLEAR}$ signal. The output will remain at a 0 level as long as the plunger 53 is depressed. When the plunger is released, the rising input to inverter amplifier 62 is converted to a falling output which drives the output of NAND gate 131 to its normal binary 1 level.

Since the plunger must be held in a depressed position for at least two clock cycles before the $\overline{CLEAR}$ signal is generated, the chances that spurious noise voltages will trigger a false clearing signal are minimal.

The $\overline{CLK}$ and $\overline{CLEAR}$ signals generated by the circuits described above are applied in a number of places in the signal averaging circuit to be described in detail with reference to FIGS. 5 and 6.

Figure 5:
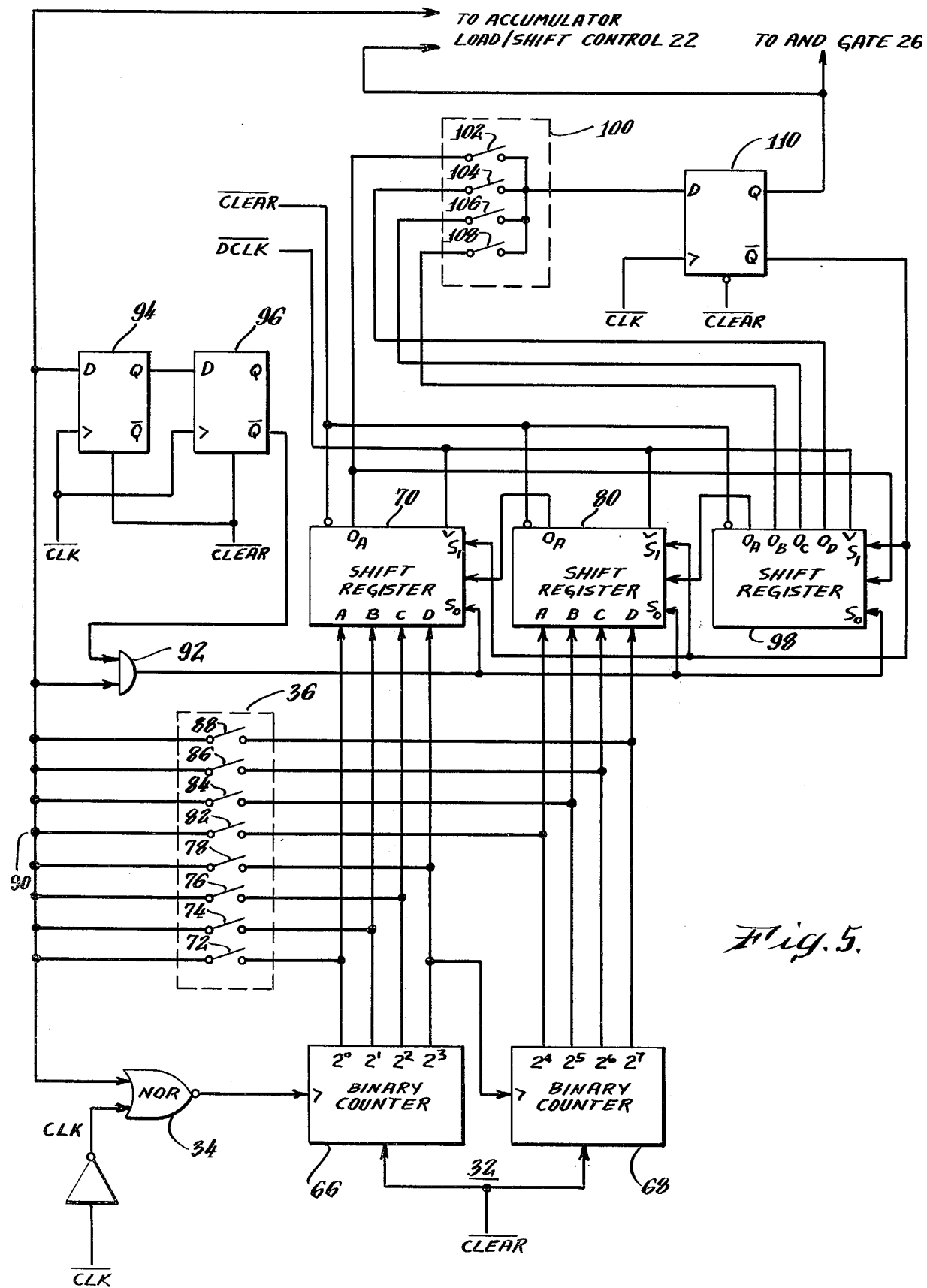
FIG. 5 is a schematic diagram of one portion of the signal averaging circuit shown in FIG. 2.

Referring to FIG. 5, binary counter 32 may be two conventional four-bit binary counter elements 66 and 68 connected in series with one another. That is, an output from the most significant stage of binary counter element 66 is connected to a load input to the least significant stage of binary counter element 68. The counter elements 66 and 68 effectively form the eight-bit binary counter 32 which is capable of counting from 0 to 255. For purposes of this invention, the maximum utlized count from the binary counter 32 is the binary representation of the decimal number 128.

The outputs of binary counter element 66 are applied to corresponding input terminals A, B, C, D of a shift register 70 and to poles of a number of different switches 72, 74, 76 and 78. The outputs of the binary counter element 68 are similarly connected to inputs A, B, C, D of a shift register 80 and to poles of switches 82, 84, 86 and 88.

The switches, taken collectively, constitute the sample number select circuit 36. By closing a selected one of these switches, an operator selects the number of samples of an input signal which will be taken in the course of the averaging process. For example, when switch 88 is closed, $2^7$ or 128 samples are taken. All switches in circuit 36 have a common connection 90 which provides the following inputs: the second input of NOR gate 34; one input of a dual input AND gate 92; the D input of a D-type flip flop 94, and one input to the accumulator load/shift control 22.

AND gate 92, D-type flip flop 94, and a second D-type flip flop 96 constitute the register load/shift control circuit 40 for the shift registers 70 and 80 and for another serially-connected shift register 98. Shift registers 70, 80 and 98 are preferably 4-bit bidirectional universal shift registers in which binary data may be loaded serially or in parallel (at the A, B, C, D inputs), shifted in either direction or held, all as functions of the signals on S1 and S0 inputs. Data contained in a shift register is presented in parallel on outputs $O_A$, $O_B$, $O_C$, $O_D$. The possible modes of operation for such shift registers are summarized in the following table:

| | MODE CONTROL | |
|---|---|---|
| | S1 | S0 |
| Parallel Load | 1 | 1 |
| Shift from A toward D | 0 | 1 |
| Shift from D toward A | 1 | 0 |
| Hold | 0 | 0 |

Suitable commercially-available shift registers are S54194/N74194 shift registers available from Signetics Corp. and described in detail at pages 2-199 of the earlier referenced Data Book.

The O output terminal of each of the shift registers is connected to the serial/load shift D→A input terminal of the adjacent shift register, making it possible to recirculate data through a series of shift D→A operations. Output $O_A$ of shift register 70 and outputs $O_C$ and $O_B$ of shift register 98 are connected, respectively, to a bank 100 of switches 102, 104, 106 and 108. The switches in bank 100 have a common output connection to the D input terminal of a D-type flip flop 110 which, in combination with switch bank 100, constitutes the shift stop circuit 42. The switch bank 100 is included to permit the signal averaging circuit to be used with scale mechanisms which produce output signals expressed as multiple binary counts per unit of weight; e.g., 4 counts per ounce. The use of switch bank 100 will be discussed when the operation of the signal averaging circuit is described. The $\overline{Q}$ output of flip flop 110 provides the S1 input to each of the shift registers 70, 80 and 98. The S0 input to each of the shift registers is provided by the output of AND gate 92 in the register load/shift control circuit 40.

The Q output of flip flop 110 provides one input to AND gate 26 and a second input to the accumulator load/shift control circuit 22, both of which are included within circuitry to be described in detail with reference to FIG. 6.

Figure 6:
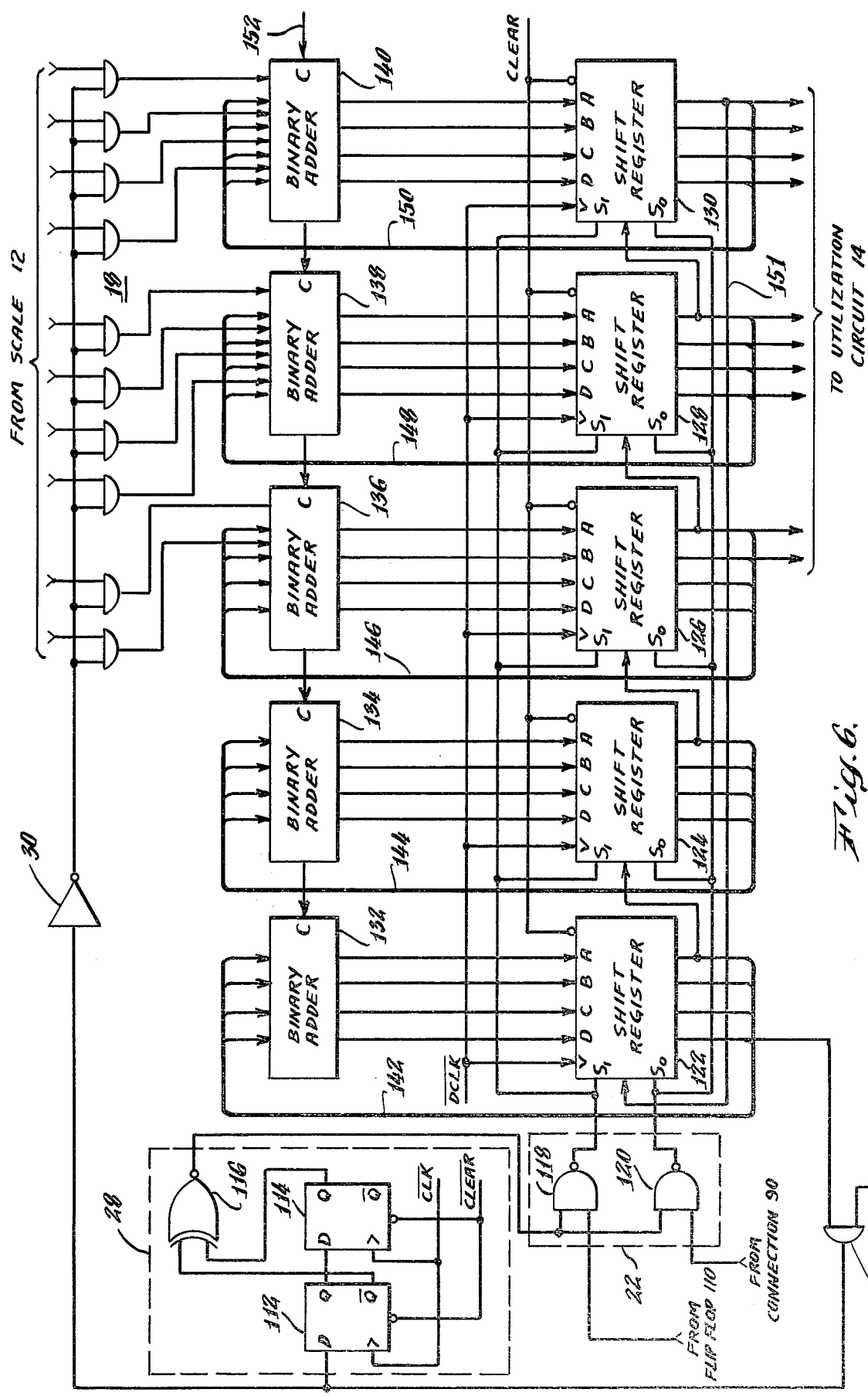
FIG. 6 is a schematic diagram of the remaining portion of the signal averaging circuit.

Referring to FIG. 6, the output of AND gate 26 is connected to the input of inverter 30 and to the D input of a D-type flip flop 112 in the rounding load control circuit 28. Circuit 28 includes a second D-type flip flop 114 having its D input connected directly to the Q output of the flip flop 112. The $\overline{Q}$ output of flip flop 112 and the Q output of flip flop 114 provide inputs to an Exclusive OR gate 116. The output of Exclusive OR gate 116 provides an input to each of two NAND gates 118 and 120 which form the accumulator load/shift control circuit 22. The second input to NAND gate 118 is provided by flip flop 110 while the second input to NAND gate 120 is provided by the common connection 90.

The output of NAND gate 118 is connected to the S1 input terminals of a number of serially-connected shift registers 122, 124, 126, 128 and 130 which are part of the accumulator circuit 16. The output of NAND gate 120 is connected to the S0 input terminals for each of these shift registers. The shift registers 122, 124, 126, 128 and 130 are connected in series with one another so that binary data can be recirculated through a number of shift D→A operations. Shift registers 122, 124, 126, 128 and 130 are preferably the same as shift registers 70, 80 and 98. The two sets of shift registers are oriented in opposite directions in the drawings but this does not alter the manner in which the registers operate.

When the outputs from NAND gates 118 and 120 are both high (binary 1 level), shift registers (122, 124, 126, 128, 130) can be loaded in parallel by an equal number of binary adder circuits 132, 134, 136, 138 and 140. Each of the binary adder circuits is capable of adding two four-bit numbers presented in parallel at eight input terminals of the adder. The carry output terminal of each of the binary adder circuits is connected to a carry input terminal of the adjoining adder circuit to provide a transfer of carry bits from right to left through the bank of binary adder circuits. Each of the binary adder circuits may be a conventional, commercially available circuit such as an S5483/N7483 binary full adder available from Signetics Corp. and described in detail at pages 2-85 of the earlier referenced Signetics Data Book.

The outputs of each of the shift registers 122, 124, 126, 128 and 130 are connected to corresponding inputs of the associated binary adder circuit. For example, the four parallel outputs of shift register 122 are connected through a cable 142 to corresponding inputs of binary adder circuits 132. Cables 144, 146, 148 and 150 provide a similar feedback of subtotal data from the remaining shift registers to their associated binary adder circuits.

Binary adder circuits 136, 138 and 140 receive inputs from the scale mechanism 12 through AND gates included within the array 18 of gates. A second input to each of the AND gates is provided by the output of inverter 30. When the output of inverter 30 is at a binary 1 level, binary weight-representing signals are continually presented in parallel at inputs to binary adder circuits 136, 138 and 140. A binary weight-representing signal is added to the subtotal of previously applied signals and the new subtotal transferred to the associated shift registers each time the registers are clocked with a $\overline{DCLK}$ pulse. The accumulating process is repeated at each occurrence of the $\overline{DCLK}$ pulse so long as the outputs of both NAND gates 118 and 120 remain at binary 1 levels.

The most significant bit of shift register 122 is connected to the second input of AND gate 26. As will be described in more detail below, the presence of a binary 1 signal at this stage in shift register 122 at a particular time in the averaging process triggers an upward rounding of a calculated averaged binary signal.

The circuits described with reference to FIGS. 5 and 6 operate in the following manner to establish the average value of a selected number of samples of an input signal.

Before the averaging process can begin, an operator must select the number of samples to be taken in computing each average value. Either 1, 2, 4, 8, 16, 32, 64 or 128 samples may be selected by closing the appropriate switch in the sample number select circuit 36. The operator must also be sure that the operation of the weight averaging circuit takes into account the number of binary counts per unit of measured weight provided at the inputs to AND gates 18. Depending upon the application, certain digital scale mechanisms may provide 1, 2, 4 or 8 binary counts per unit of measured weight. The operator, knowing the characteristics of the scale mechanism, must close the appropriate one of the switches 102, 104, 106 or 108 in bank 100. Switch 102 would be closed for a scale mechanism having one binary count per unit of measured weight. Switches 104, 106 and 108 would be closed for scale mechanisms having, respectively, 2, 4 and 8 binary counts per unit of measured weight.

For purposes of illustration, it will be assumed that 128 samples are to be taken and that the scale mechanism produces 8 binary counts per ounce of measured weight. Switch 88 in circuit 36 and switch 108 in circuit 42 would be closed by an operator as shown.

Figure 4:
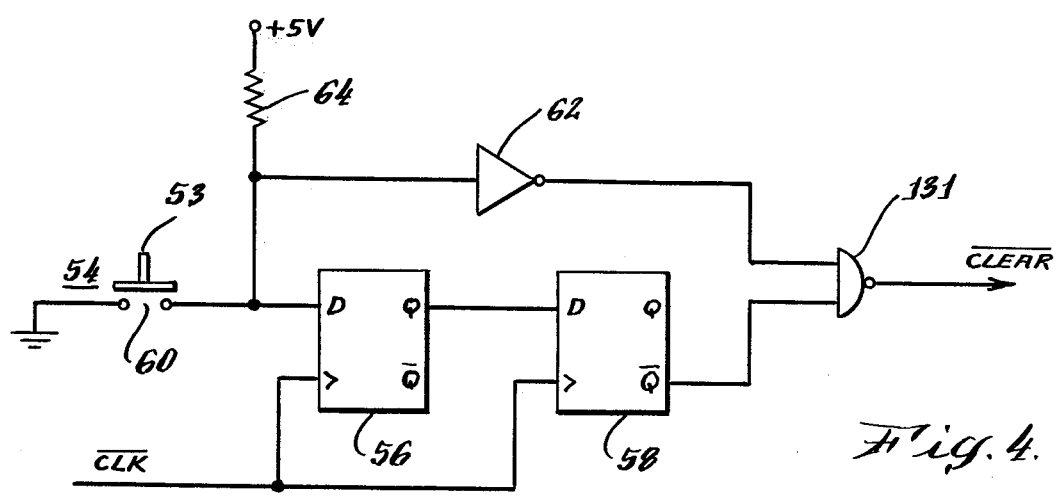
FIG. 4 is a schematic diagram of a $\overline{\text{CLEAR}}$ pulse generator.

The operator then initiates the process by depressing the plunger 53 of switch 54 in the $\overline{CLEAR}$ signal generator described with reference to FIG. 4. The generated $\overline{CLEAR}$ signal resets the following elements: binary counter elements 66 and 68, shift registers 70, 80 and 98, flip flops 94, 96, 110, 112 and 114, and shift registers 122, 124, 126, 128 and 130.

When binary counter elements 66 and 68 are cleared, producing binary 0 signals on all outputs, the voltage at the common connection 90 falls to a binary 0 level, thereby enabling NOR gate 34 to apply $\overline{CLK}$ pulses at the clock input of binary counter 66. The low level signal provided by common connection 90 at one input of AND gate 192 causes the gate to generate a binary 0 signal at the S0 inputs of shift registers 70, 80 and 98. When flip flop 110 is cleared, its Q output carries a binary 1 signal which is applied to the S1 inputs of the same shift registers. This combination of S1 and S0 inputs to the shift registers causes the registers to operate in a shift D→A mode under the control of a $\overline{DCLK}$ input. However, having been previously cleared, the shift registers shift only binary 0's, which have no effect on circuit operation.

When flip flops 112 and 114 in rounding load control circuit 28 are cleared, Exclusive OR gate 116 causes a binary 0 signal to be applied to one input of NAND gate 120. The second input of NAND gate 120 from common connection 90 is also a binary 0 signal, resulting in a binary 1 output from NAND gate 120. The second input to NAND gate 118 provided by the cleared flip flop 110 is also a binary 0 signal, causing the output of NAND gate 118 to assume a binary 1 state. The binary 1 signals on the outputs of NAND gates 118 and 120 condition shift registers 122, 124, 126, 128 and 130 to be loaded in parallel from the outputs of the associated binary adders upon the occurrence of each $\overline{DCLK}$ pulse.

During this phase of the averaging operation, which may be described as a load phase, the binary counter 32 counts applied $\overline{CLK}$ pulses while samples of input signals provided to AND gates 18 are added to the existing contents of binary adder circuits 132, 134, 136, 138 and 140 to produce an accumulated signal which is transferred to the associated shift registers upon the occurrence of the $\overline{DCLK}$ pulse. The repeated loading of the shift registers in accumulator circuit 16 continues until binary counter 32 attains a decimal count of 128. When this count is attained, the $2^7$ output of binary counter element 68 will be at a binary 1 level. The voltage on common connection 90 will also be driven high since connection 90 is coupled to the $2^7$ output through closed switch 88.

The appearance of a binary 1 signal on common connection 90 does several things. NOR gate 34 becomes inhibited to prevent the application of any more $\overline{CLK}$ pulses to binary counter 66. A binary 1 signal is provided at one input to AND gate 92 which becomes fully enabled. AND gate 92 causes a binary 1 signal to be applied to the S0 input terminals of shift registers 70, 80 and 98. The S1 input to each of these shift registers is already high. When the S0 input terminals go high, the shift registers are transferred to a parallel load mode of operation. Since only the $2^7$ output of binary counter 68 element carries a binary 1 signal at a count of 128, a binary 1 is loaded at the D input of shift register 80. Binary 0's are loaded at inputs A, B, C, D of shift register 70 and inputs A, B, C, of shift register 80.

When the common connection 90 is driven to the binary 1 level, the resulting binary 1 at the D input terminal of flip flop 94 causes that flip flop to immediately set. However, the second flip flop 96 remains reset following the clock pulse, allowing time for the binary 1 signal to be loaded from binary counter element 68 into shift register 80. Upon the occurrence of the next $\overline{CLK}$ pulse, flip flop 96 is driven to a set state causing a binary 0 signal to be applied through its $\overline{Q}$ output terminal to AND gate 92. The AND gate 92, which is disabled by this input from flip flop 96, causes a binary 0 signal to be applied to the S0 input terminals of the shift registers 70, 80 and 98. When S1 remains at 1 and S0 goes to 0, the shift registers 70, 80 and 98 operate in a shift D→A mode. Thus, the binary 1 signal loaded into input stage D of shift register 80 begins to shift to the left at the first $\overline{DCLK}$ pulse following the loading of the shift registers.

When the common connection 90 is driven to a binary 1 signal at the count of 128, NAND gate 120 is disabled causing a binary 0 signal to appear on the S0 input terminals of shift registers 122, 124, 126, 128 and 130. This binary 0 signal at the S0 input terminals inhibits further loading of input signals while conditioning the shift registers 122, 124, 126, 128 and 130 to operate in a shift D→A mode. The totalled data moves from left to right or from the most significant bit to the least significant bit of the registers. The shifting operations actually start upon the subsequent first occurrence of a $\overline{DCLK}$ pulse.

The binary 1 signal loaded into shift register 80 and the contents of the shift registers in the accumulator circuit 16 are repeatedly shifted, one stage at a time, until the binary 1 signal loaded into register 80 has passed completely through shift register 80 and shift register 70 and had been recirculated through the first two stages of shift register 98 into the third $O_B$ stage.

The total number of shifts which occur is a function of the number of samples and the number of counts per ounce provided by the scale mechanism. For the selected 128 (or $2^7$) samples and a scale mechanism with 8 (or $2^3$) counts per ounce, the binary 1 signal will be shifted through a total of ten shift register stages before appearing at stage $O_B$ of shift register 98. Similarly, the contents of the shift registers in the accumulator circuit 16 will be shifted through 10 successive shift register stages. The shifting of the contents of the shift registers in accumulator circuit 16 effects a binary division of those contents. Thus, the contents of the accumulator circuit 16 are divided by a factor of $2^7 \times 2^3$ or 1024. The first division by $2^7$ causes the accumulated total of 128 samples to be divided by 128 to derive the average sample value. The second division by $2^3$ or 8 compensates for the fact the scale mechanism has 8 counts per ounce and assures that the bit in the extreme right stage of shift register 30 will represent the least significant unit bit of an average signal expressing weight in ounces rather than counts per ounce.

When the binary 1 signal appears on stage $0_B$ of shift register 98, it also appears on the D input terminal of flip flop 110. Upon the occurrence of the next $\overline{CLK}$ pulse, flip flop 110 is driven into a set state. The resulting binary 0 signal on the $\overline{Q}$ output terminal causes the S1 inputs to shift registers 70, 80 and 98 to assume a binary 0 level. Since the S0 input terminal of each of these shift registers is already at a binary 0 level, all three shift registers 70, 80 and 98 become completely inhibited. No further shifting will occur and no load operations may be performed in these registers.

When flip flop 110 sets, the binary 1 signal on its Q output terminal partially enables AND gate 26 while causing NAND gate 118 to produce a binary 0 signal at the S1 input terminals for the shift registers in the accumulator circuit 16. With both the S1 and S0 inputs at a binary 0 signal, the shift registers in accumulator circuit 16 are also completely inhibited. No further shifting or loading operation will occur in the absence of a further change in the stage of the S1 and S0 input terminals.

At this point in the circuit operation, a non-rounded, averaged signal value exists in shift register stages 126, 128 and 130. During the shifting of contents of these shift registers, binary information shifted from the least significant stage of shift register 130 is recirculated through lead 151 to the most significant stage of shift register 122. For that reason, at the conclusion of the shifting operation, shift registers 122, 124 and 126 contain binary signals representing the fractional portion of the averaged signal. To determine whether upward rounding is necessary, the most significant fractional bit stage of shift register 122 is connected to the second input of AND gate 26.

If a binary 1 appears at this stage of shift register 122, the output of AND gate 26 is driven to a binary 1 level when flip flop 110 sets to end the shifting operations. The binary 1 signal on the output and AND gate 26 is inverted by inverter 30 to provide a binary 0 signal at one input to each of the AND gates in array 18. Under these conditions, the AND gates block any further inputs from the scale mechanism 12.

The binary 1 signal at the output of AND gate 26 is applied both to a carry input 152 for binary adder circuit 140 and to the D input terminal of flip flop 112 in rounding load control circuit 128. Upon the occurrence of the next clock pulse, flip flop 112 is driven into a set state while flip flop 114 remains in a reset state. Both inputs to the Exclusive OR gate 116 will be a binary 0 level under these conditions, causing OR gate 116 to apply a binary 0 signal to each of the NAND gates 118 and 120. The outputs of the NAND gates 118 and 120 are driven to binary 1 levels to enable the shift registers and accumulator circuit 16 to be loaded in parallel.

Since the AND gate array 18 blocks further signals from the scale mechanism, the only value to be added is the binary 1 signal presented on the carry input terminal 152 of binary adder 140. A binary 1 carry input to binary adder 140 increments the averaged signal existing in shift registers 126, 128 and 130 by one to provide the upward rounding.

The shift registers in accumulator circuit 16 remain in a load mode of operation only until the next clock pulse occurs. Upon occurrence of the next CLK pulse, flip flop 114 is driven into a set state causing dissimilar inputs to be applied to Exclusive OR gate 116. The resulting binary 1 signal on the output of Exclusive OR gate 116 disables NAND gates 118 and 120; that is, causes those NAND gates to produce binary 0 signals at their outputs which completely inhibit shift register in accumulator circuit 16 from further loading or shifting.

If the most significant bit stage of shift register 122 is found to contain a binary 0 signal, indicating that no upward rounding is required, the output of AND gate 26 remains at a binary 0 signal level when flip flop 110 sets at the end of the shifting operations. Under these conditions, signals from the scale mechanism continue to be applied to the binary adder circuits. However, the shift registers in the accumulator circuit 16 are inhibited from further loading or shifting by the binary 0 signals at the outputs of NAND gates 118 and 120.

While there has been described what is considered to be a preferred embodiment of the invention, variations and modifications will occur to those skilled in the art once they become acquainted with the basic concepts of the invention. For example, the signal averaging circuit is not limited to use in generating averaged weight signals. Any kind of signal can be averaged in the subject circuit regardless what that signal represents. Therefore, it is intended that the appended claims shall be construed to include all such variations and modifications as fall within the true spirit and scope of the invention.

What is claimed is:

1. An averaging circuit for use in a system including a source of clock pulses, said averaging circuit for establishing an average of a selected number of input values, comprising:

a multistage accumulator circuit for totalling applied input values, said circuit being capable of shifting data between serially-connected stages;

a counter;

means for enabling said counter to begin counting clock pulses and for terminating the counting operation when the selected number has been counted;

a shift register connected to said counter;

a register load/shift control circuit for enabling said shift register to receive a binary signal from said counter at the termination of counting and for initiating the shifting of the binary signal serially through said register;

an accumulator load/shift control circuit connected to said accumulator and to said register load/shift control circuit for causing input values to be loaded into said accumulator circuit in synchronism with the counting with clock pulses and for causing the contents of the accumulator to be shifted in synchronism with the shifting of the contents of said shift register to effect a binary division of the accumulator contents; and shift stop means connected to said accumulator load/shift control circuit and to said shift register for responding to the presence of a binary signal at a selected stage of said device to inhibit further shifting in said accumulator circuit and in said shift register.

2. An averaging circuit as recited in claim 1 further including:

rounding detect means for detecting a predetermined binary signal at a particular stage in said multistage accumulator circuit upon operation of said shift stop means; and rounding load control means responsive to the presence of said predetermined binary signal for conditioning said multistage accumulator circuit to be loaded with a binary circuit for upwardly rounding the averaged signal.

3. An averaging circuit for use in a system in which the input values are represented as multiples of a unit of measure, said averaging circuit as recited in claim 2 for establishing an average value expressed in the units of measure wherein said shift stop means includes:

a flip flop which is driven from one stable state to the other stable state when a predetermined binary signal is detected at a particular stage of said shift register device; and means for connecting different stages of said shift register device to said flip flop whereby the number of shift operations performed is a combined function of the selected number of samples of input signals and of the multiplying factor for the input values.

4. An averaging circuit as recited in claim 2 wherein said count enabling and terminating circuit comprises:

a bank of switches, each of which has one terminal connected to a different output from said counter and another terminal connected to a connection common to all of the switches of said bank;

one of said switches as being closed by an operator prior to the averaging operation to select the number of input values to be averaged; and a logic gate having an input from the common connection of said switch bank, another input for receiving clock pulses and an output to said counter, said gate being enabled to pass clock pulses to said counter until the signal level on the closed switch changes upon attainment of the selected count to provide a disabling input through said common connection to said logic gate.

5. An averaging circuit as recited in claim 4 wherein said register load/shift control circuit includes:
   a first flip flop having an input connected to the common connection of said switch bank and a clock input for receiving clock pulses;
   a second flip flop having an input connected to a normal output of said first flip flop and another input for receiving clock impulses; and
   an AND gate having an input connected to the common connection of said switch bank, another input connected to the inverted output of said second flip flop and an output connected to the load/shift control terminal of said shift register, said AND gate being enabled for one clock period upon attainment of the selected count to permit loading of a binary signal from said counter into said shift register and thereafter to permit shifting of the binary signal through said device.

6. An averaging circuit as recited in claim 5 wherein said rounding detect means comprises an AND-type gate having one input from the particular stage of said accumulator circuit and another input from said shift stop means, said gate being completely enabled only when the detected binary signal appears at the particular stage in said accumulator circuit at the time of operation of said shift stop means.

7. An averaging circuit as recited in claim 6 wherein said rounding load control means comprises:
   a first flip flop having an input connected to said AND-type gate and another input for receiving clock pulses;
   a second flip flop having an input from the inverted output of said first flip flop and another input for receiving clock pulses; and
   an Exclusive-OR gate having inputs from the inverted output of said first flip flop and from the normal output of second flip flop and an output to said accumulator load/shift control circuit, said Exclusive-OR gate providing an accumulator load-enabling signal for one clock pulse period beginning with the change of state of said shift stop means.

8. An averaging circuit as recited in claim 7 wherein said accumulator load/shift control means comprises:
   a first NAND gate having an input from said Exclusive-OR gate, another input from said shift stop means and an output to a load/shift input terminal of said multistage accumulator circuit; and
   a second NAND gate having an input from said Exclusive-OR gate another input from the common connection of the switch bank in said count enabling and terminating circuit and an output to another load-switch control terminal of said multistage accumulator circuit.

* * * * *

UNITED STATES PATENT AND TRADEMARK OFFICE
CERTIFICATE OF CORRECTION

PATENT NO. : 4,137,568
DATED : January 30, 1979
INVENTOR(S) : Daniel F. Dlugos

It is certified that error appears in the above—identified patent and that said Letters Patent is hereby corrected as shown below:

Column 5, line 21, change "momemtary" to -- momentary --.
Column 5, line 25, change "transfer" to -- transfers --.
Column 6, line 15, change "utlized" to -- utilized --.

IN THE CLAIMS:
Claim 8, Column 14, line 24, insert a comma -- , -- after "Exclusive-OR gate".

Signed and Sealed this

Tenth Day of November 1981

[SEAL]

Attest:

*Attesting Officer*

GERALD J. MOSSINGHOFF
*Commissioner of Patents and Trademarks*